Patented June 24, 1930

1,767,836

UNITED STATES PATENT OFFICE

HENRY K. B. DAVIS, OF MAMARONECK, NEW YORK, ASSIGNOR, BY DIRECT AND MESNE ASSIGNMENTS, TO MAVIS MACHINE CORPORATION, OF NEW YORK, N. Y., A CORPORATION OF NEW YORK

METHOD AND APPARATUS FOR SHAPING SHAFTS

Application filed July 7, 1928. Serial No. 291,095.

The present invention relates to the manufacture of golf clubs and more particularly to a method and apparatus for shaping the ends of shafts to fit the bore in iron heads, although many of its features are applicable to fitting shafts into heads generally.

In the manufacture of golf clubs, particularly those having iron heads, the heads are reamed to provide a conical bore to receive a shaft having its end correspondingly tapered. The present machinery for reaming the bore in these heads is not capable of aligning the bore properly. The failure of the axis of the bore to coincide with the axis of the head, which in some cases differs by as much as several degrees, prevents a properly tapered shaft from aligning with the head when assembled therewith and hence forms an imperfect club. It has been necessary in the past, to have skilled workmen reshape the tapered ends of the shafts manually to secure a better fit and to make the shaft align with the head. The amount of reshaping is determined by repeated applications of the shaft to the head. Such shaping consumes considerable time, increases the cost, and at best is only an approach to proper alignment and a perfect club.

The present invention overcomes these difficulties by providing a method and apparatus adapted to shape each shaft to fit the particular head to which it is to be attached irrespective of any errors in the bore of the head. Since the shafts are shaped initially to fit a particular head, reshaping is unnecessary. Upon the first application of the shaft to the head there will be an accurate fit and a perfect club. The cost of shaping and assembling is accordingly minimized by decreasing the necessary time and labor for these operations.

An object of the invention is to provide a method and apparatus for shaping shafts accurately to fit the bores of individual heads.

Another object of the invention is to provide a method of correcting for the error in the bore of a head by causing a corresponding error in the shaping of a shaft to fit the head.

Another object of the invention is to facilitate assembling of shafts and heads and to obtain correct alignment by initially shaping each shaft to correspond with the alignment of the bore in the particular head with which it is to be assembled.

Another object of the invention is the provision of means for aligning a shaft for a shaping tool in parallel relation to the bore in the head with which it is to be assembled.

A further object of the invention is to provide means for readily positioning a head with respect to a shaping tool; to provide mechanism for fixing a shaft to be shaped; and to provide devices responsive to the bore of the head for aligning the shaft.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings; wherein Fig. 1 is a perspective view of a machine embodying one form of the invention;

Fig. 4 is an end elevational view partly in section on the line 4—4 of Fig. 2 illustrating the mounting of the connecting bar.

Figure 1:
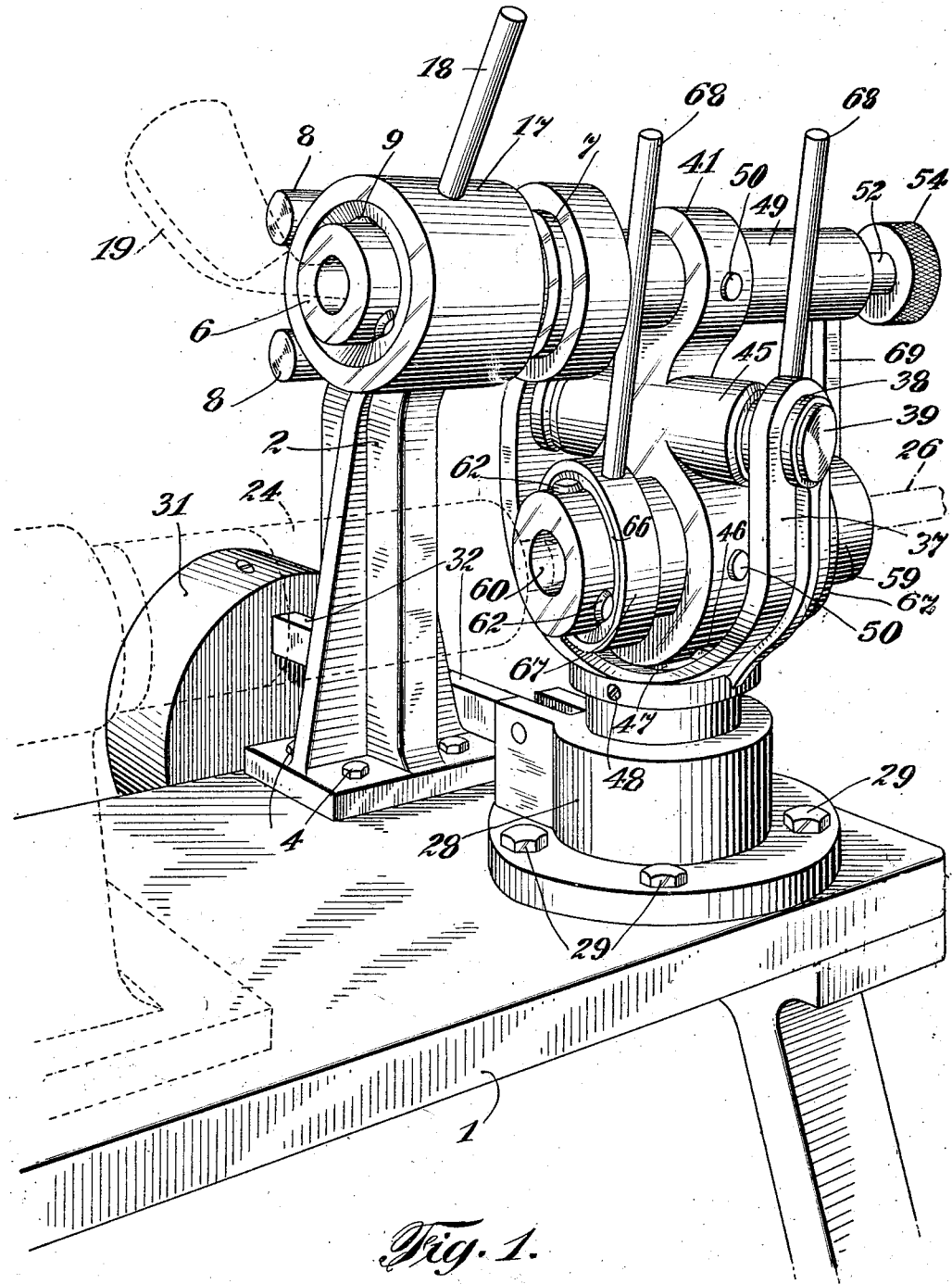

Described generally, the present invention contemplates mounting a fixed holder for iron heads, preferably of the class used for golf clubs, so that consecutive heads may be inserted, positioned accurately and removed with the least time and trouble. Adjacent the holder, there is provided a pair of hollow members which are interconnected and mounted to permit universal movement to a limited extent, the movement of one being communicated to the other. Extending through one of these hollow members is a member having its end shaped to fit into the bore of an iron head or similar article. By inserting this member into the bore of the article mounted in the holder, the direction of the bore is gaged and any errors therein are communicated to the second hollow member to position it responsively to the angular direction of the bore.

The cutting tool for tapering the end of a shaft is mounted adjacent the second hollow member. By inserting a shaft through this second hollow member and by suitably fixing it in position therein, the shaft will be in parallel relation to the member inserted in the bore of the head and hence will be cut with an error corresponding to the error in the bore. In this way each shaft is shaped for a particular head and when properly turned will be perfectly aligned with the head irrespective of any error in the bore.

Referring more particularly to the drawings, illustrating a preferred embodiment of the machine and one way of practicing the method, there is shown a suitable support 1, having an upwardly extending bracket 2 secured to the support by bolts 4. The outer end of the bracket 2 has a cylindrical aperture or bearing 5 into which a holder 6 fits snugly, being held in position by the threads 13. The position of the holder is determined by the shoulder 7 thereon engaging the side of the bracket. The studs 8 are adapted to hold the sleeve 17 concentric with the holder 6 irrespective of any slight play in the threads on the inner surface thereof. The holder is also provided with a plurality of pins 9 preferably six in number, mounted in pairs, one hundred and twenty degrees apart. These pins have heads fitting into recesses 10 and held in their outward position by means of coiled springs 11 seated beneath the heads in the recesses.

A pair of collars 12, having cam surfaces 14 in engagement with the bevelled edges of the pins 9 are mounted about the holder 6. These collars 12 are slidable longitudinally of the holder but held against rotation by a key 15. The outer surfaces of each collar are in threaded engagement with a sleeve member 17, the inner surface of which has right and left-hand screw threads, at its respective ends to engage with similar threads on the exterior of the collars 12. When the sleeve member 17 is rotated by means of a handle 18 the collars 12 are moved toward each other or away from each other, depending upon the direction of rotation. When moved away from each other, the pins 9 are caused to move inwardly to engage and hold a suitable article placed within the holder 6. The article here shown is the head 19 having a bore 20 therein adapted to be assembled with a suitable shaft to form a golf club. Since the collars 12 are slidable with respect to the holder they are free to adjust themselves so that the same pressure is applied to each of the pins. In other words, if the pins at one end grip the head first, the pair of collars 12 together with the member 17 will shift axially until the other pins have moved sufficiently far to engage the smaller portion of the head. Further rotation of the sleeve 17 applies equal pressure at both ends. This equal and simultaneous adjustment of the pins also assures the head being mounted at the center of the holder and in the same position irrespective of the shape of the head. The movement of the head into the holder may be limited by a suitable pin 22.

A shaping tool 24 having a cutting blade 25 is mounted in fixed relation to the holder 6, preferably in parallel relation thereto and is adapted to be moved longitudinally toward and away from a suitable shaft 26 to shape the shaft for application to a suitable head.

In order to support and position a shaft to be shaped, there is provided on the support 1, a bearing 28 bolted to the support at 29 and having mounted therein a cylindrical member 30 adapted to slide in a vertical direction. A suitable weight 31 is attached to the arm 32 which is pivoted at 34 with the free end 35 fitting in a slot 36 in the member 30. The position of the weight on the arm 32 is such that it balances the member 30 and its associated mechanisms so that these parts will move freely in a vertical direction. The slot 36 is slightly wider than the end 35 of the arm 32 to permit rotational movement of the member 30. The upper end of the member 30 has a pair of arms 37 with bearings 38 at their upper ends to receive a shaft 39. This shaft is fixed in the bearings by means of the pins 40 and has slidably mounted thereon a member 41 with apertures 42 and 44 at its upper and lower parts. The lower part of the member 41 is slotted at 46 to receive a suitable member 47 held in position by a screw 48 to permit lateral movement of the member 41 and to prevent rotative movement about the shaft 39.

There is a cylindrical member 49 pivotally mounted in the upper aperture 42 by means of the trunnions 50 engaging diametric recesses 51 in the sides of the cylindrical member. The central part of the member 49 is reamed to receive a member 52 which has a suitable knob 54 on one end to facilitate manual positioning thereof and which has its other end tapered as shown at 55 to enter into the bore of a head. Preferably the tapered end 55 has a suitable thread 57 to insure a more accurate fit between the bore in the head 19 and the tapered end of the member 52.

The lower aperture 44 in the member 41 has a cylindrical member 59 pivotally mounted therein in the same manner as the member 49 is mounted in the aperture 42, with a central bore 60 adapted to receive the shaft 26. Since shafts for golf clubs and the like differ in shape, it is necessary to provide means for holding the shaft accurately disposed with respect to the member 59. This may be done in a manner somewhat similar to that described with respect to the holder 6 and the head 19. A plurality of pins 62, preferably three in number, are mounted at each end of the member 59 in the recesses 64. Suitable coiled springs 65 hold the pins in their outward position against the cam surfaces 66 of the collars 67 threaded to the outside of the member 59. Suitable handles 68 may be utilized independently for positioning the shaft 26 at two points. Since the pins 62 are moved inwardly the same amount, the shaft is positioned centrally of the member 59.

A bar 69 has its ends 70 and 71 pivotally attached to the members 49 and 59, respectively, to communicate the movement of one to the other. When the member 52 is inserted into the bore of the golf head 19 the holding member 49 assumes a definite position, and this position is communicated to the holding member 59 and shaft 26 so that the latter is positioned responsively to the direction of the bore 20 in the head 19. When thus positioned the cutting tool is operated to shape the end of the shaft.

In the operation of the device, the head 19 is fixed in the holder 6 by first moving the handle 18 to bring the collars 12 toward each other and to permit the springs 11 to move the pins to their outermost position. Thereafter the head is inserted in the holder until it engages the pins 22 limiting its inward movement, and the handle 18 is turned in the opposite direction to cause the pins to engage firmly the head. If the pins at one end engage the shaft first, the collars 12 and member 17 slide axially until the pins at the other end engage the head with equal firmness so that the same pressure is applied by both sets of pins. At this time, the member 52 preferably is not in engagement with the head but is in its ineffective position.

Figure 2:
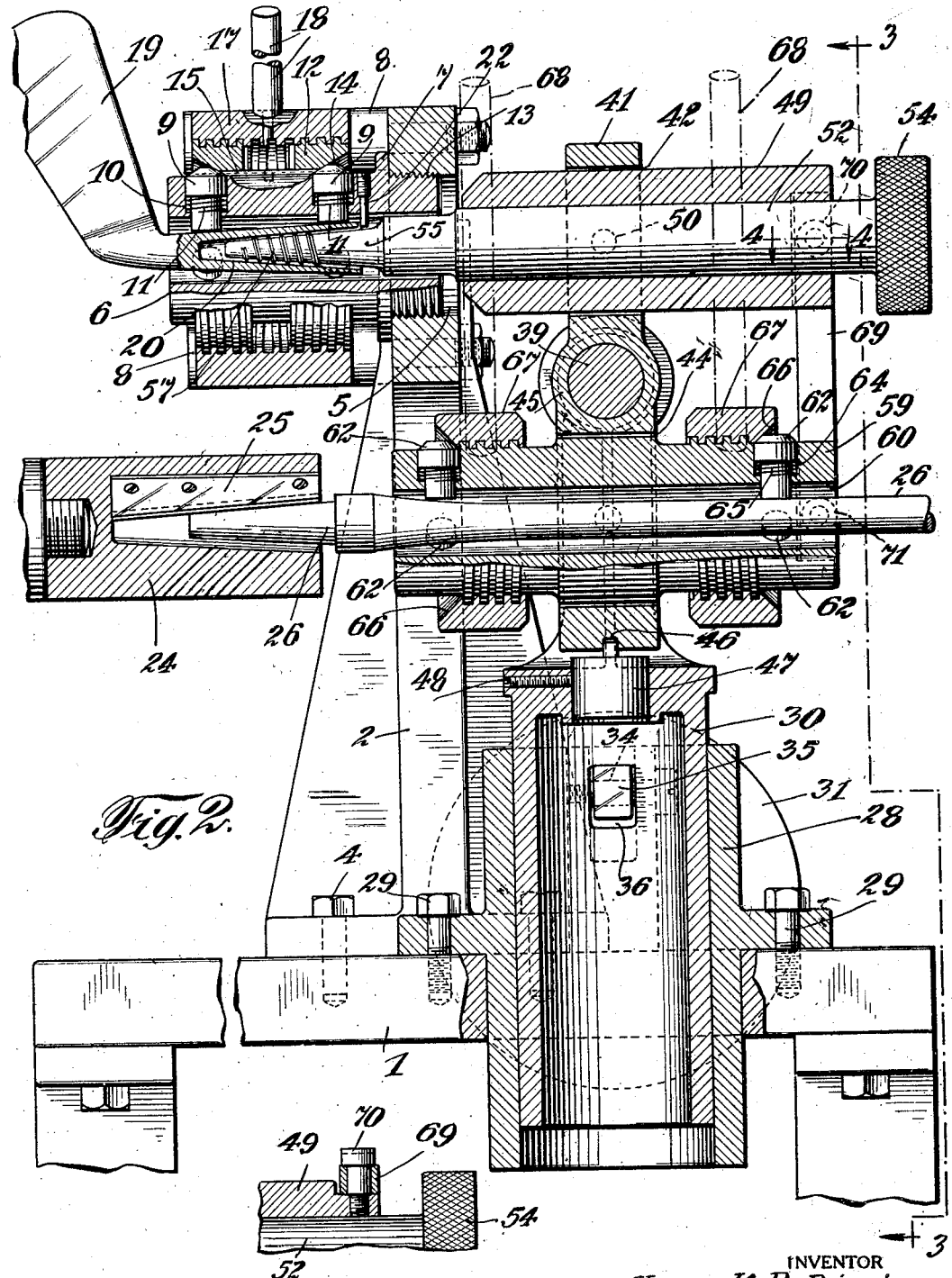
Fig. 2 is a longitudinal sectional view illustrating details of the mechanism taken on line 2—2 of Fig. 3.
Figure 3:
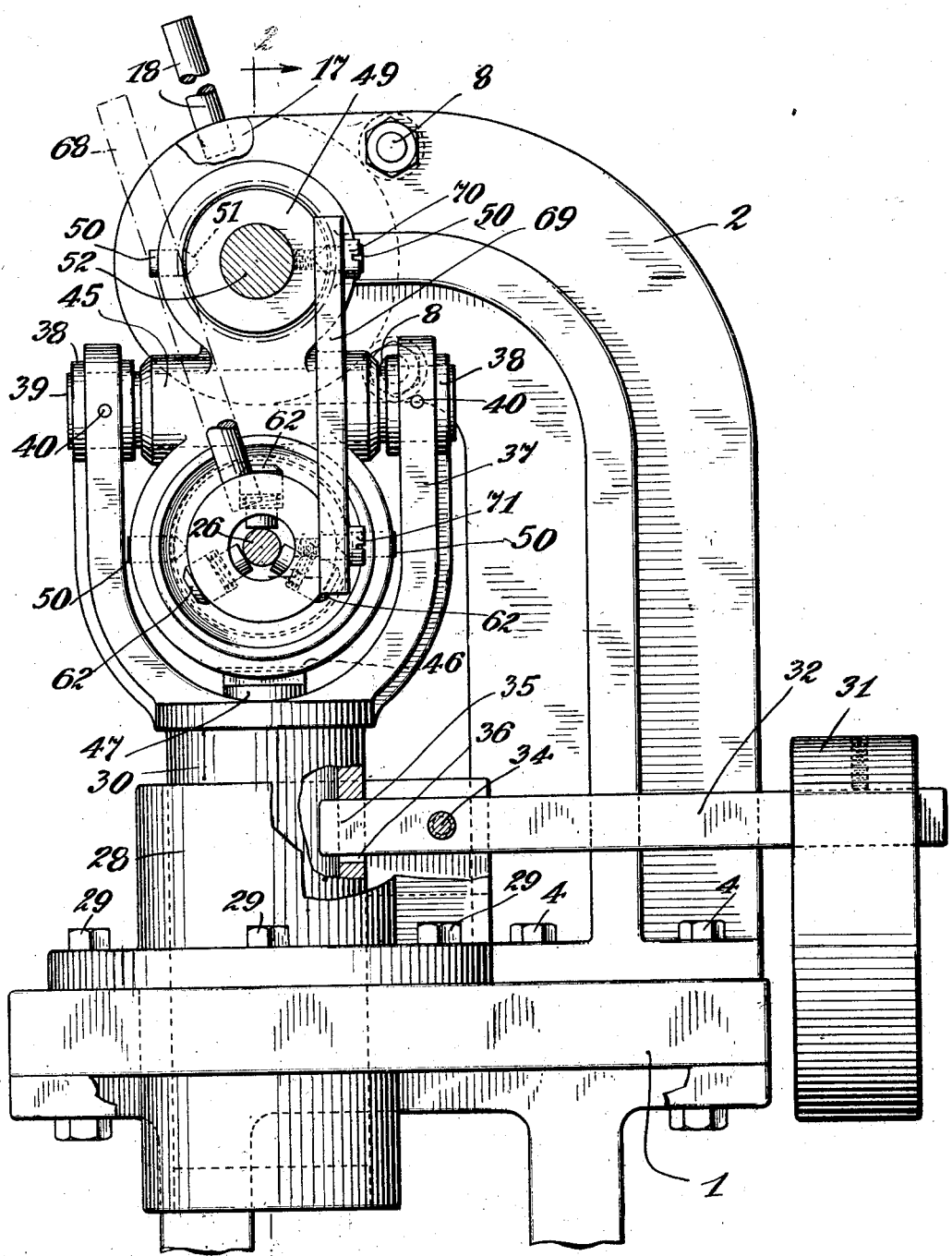
Fig. 3 is a sectional view of the machine taken on line 3—3 of Fig. 2.

The shaft 26 adapted to be assembled with the head 19, is mounted in the member 59, by first turning the collars 67 by the handles 68 to move the pins to their outer position for insertion of the shaft. Thereafter, the handles 68 are moved in the opposite direction to cause the collars 67 to press the pin 62 against the shaft and to hold it in proper position. The member 52 is then forced to the left in Fig. 2 into the position shown, whereupon this member, which is in effect a counterpart of the shaft 26, will be given a cant corresponding to the error in the bore, if the bore is not accurately aligned in the head. This error will be communicated to the shaft 26 by means of the bar 69 and members 49 and 59. In this way the shaft 26 is, in each instance, positioned for the shaping tool in response to the bore in the particular head with which it is to be assembled. It will be understood that in assembling the shaft and head, the shaft is rotated 180 degrees with respect to the head or vice versa to make the errors in each correspond and neutralize. This may be facilitated by suitable marks on the respective members. The positioning parts mounted upon the member 30 may be balanced by properly positioning the weight 31 so that the member 52 fitting into the head and also the shafts 26 are readily movable in a vertical direction. They are likewise slidable laterally by means of the connecting part 46 and the bearing 45 on the shaft 39. The members 49 and 59 are pivotally mounted in the apertures 42 and 44, respectively. It will be seen that the member 41 may be rotated about its vertical axis, moved in a vertical direction, and likewise permitted to slide on the shaft 39 in a horizontal direction. Hence, this member may be moved in any one of four directions to a limited extent. In addition, the holding members 49 and 59 are pivotally mounted on the trunnions 50 so that they may be rotated in a vertical plane. Both the shaft 26 and the member 52, therefore, are pivoted to move in a horizontal plane or in a vertical plane and the pivot may be moved in any one of four directions, thus giving a universal movement. Suitable connections between the members 49 and 59 communicate any movement of the member 52 to the shaft 26.

It will therefore be seen that the method provided herein is simple and effective to shape the end of a shaft so that it will fit accurately the bore of a head. This may be done with a single fitting and thereby save considerable time and labor. The machine illustrating the preferred embodiment of the invention and one way of carrying out the method is simple in construction and readily manufactured. The parts are fully capable of withstanding the rough usage to which they may be subjected. The bearings and other mountings communicate accurately movements of the member fittings into the head to the shaft to be shaped. All parts are readily movable to permit positioning of the shaft with respect to the bore in the head.

As various changes may be made in the above embodiment without departing from the spirit of the invention it is to be understood that all matter herein is to be interpreted as illustrative and not in a limiting sense as the scope of the invention is defined in the claims.

Having thus described my invention, I claim:

1. The method of correcting for the error in the bore of an iron head which consists in shaping the end of the shaft to be assembled therein with a corresponding error, and then turning the shaft substantially one hundred and eighty degrees with respect to the error in the bore and assembling same.

2. The method of correcting for the error in the bore of iron heads for golf shafts which comprises aligning the unshaped shaft in parallel relation to the axis of the bore of the head to which it is to be assmbled, shaping the end of the shaft while held in this position to provide an error in the shaped end corresponding to the error in the bore of the head, and then turning the shaft substantially one hundred and eighty degrees with respect to the error in the bore and assembling same.

3. The method of correcting for the error in the bore of iron heads for golf clubs, which consists in fixing the head with respect to a shaping mechanism, fixing the axis of the shaft with reference to the axis of the bore in said head, and then shaping the end of the shaft for assembling with the head.

4. In a device of the class described, the combination of means for shaping the end of a golf shaft, a holder for a golf shaft, pivoted devices bodily movable in a vertical direction for freely supporting the holder whereby said holder is permitted universal movement, means for mounting a golf shaft head and devices having a fixed relation to said holder but adapted to engage and have their position governed by the bore of said head.

5. In a device of the class described, the combination of pivoted means for holding a shaft to be shaped to fit the bore of a head, devices for holding the head in fixed position, a pivoted member for insertion into the bore of the head to position said shaft holding means, said member and said holding means being interconnected to transmit the movement of one to the other, and a bodily movable support for said means and said member.

6. In a device for shaping the end of a shaft to correct for the error in the bore of the head, the combination of means for holding a head having a bore therein adapted to receive a golf shaft, a member adapted to be inserted into said bore for positioning a shaft with respect thereto, the portion of said member adapted to be inserted into the bore being ribbed to assure a more accurate fit therewith, and means for relatively locating work and shaping means one to the other controlled by said member.

7. A cutter having a definite relation to a predetermined axis, means for mounting a head so that its outer contour shall be parallel with said axis of said cutter, means for mounting for universal movement but in mutual control of each other of a feeler and a work carrier in such relation that said feeler is adapted to enter and fit a bore in the head above referred to and will insure the same accurate angular relation of the axis of said holder to the cutter as the bore of said bead bears to the said axis of said cutter.

8. In a shaping device, the combination of a cutter having a definite relation to a predetermined axis, means for mounting a head with the axis thereof parallel to the axis of said cutter, means for mounting for universal movement but in mutual control of each other of a feeler and a work carrier, said feeler being adapted to enter and fit a bore in the head above referred to to insure the same angular relation of, the axis of said holder to the cutter as the bore of said head bears to the axis of said cutter.

9. The method of fitting golf shafts to iron heads, the bores of which are not centrally disposed in all cases, which method comprises fixing the head with respect to the shaping mechanism, fixing the shaft with reference to the axis of the bore in said head, shaping the end of the shaft while thus fixed to provide an error therein corresponding to the error in the bore of the head, and assembling said shaft and head.

10. The method of correcting the error in the bore of iron heads for golf clubs, which method comprises fixing the head with respect to a shaping mechanism, fixing the shaft with reference to the axis of a bore in said head, and then shaping the end of the shaft to provide an error therein corresponding to the error in the bore of the head.

11. A shaping device comprising a cutter and a pattern head mounted so as to maintain a fixed relation between certain axes thereof, a work-holder and a pattern follower mounted so as to maintain a like fixed relation between corresponding axes, and means for mounting one of these pairs of instrumentalities so as to be bodily and angularly movable so that the same relation of the axis of the follower to the pattern, which the pattern imposes upon the follower, is imposed upon the axis of the workholder.

12. A shaping device for golf shafts to be assembled with iron heads, comprising the combination of a shaping means and a pattern head having a bore therein mounted so as to maintain a fixed relation between certain axes thereof, a work holder adapted to receive and hold a golf shaft, and a pattern follower adapted to fit in the bore of the pattern head and mounted to maintain a like fixed relation between corresponding axes, and means for mounting one of those pairs of instrumentalities so as to be bodily and angularly movable so that the same relation of the axis of the follower to the pattern which the pattern imposes upon the follower is imposed upon the axis of the work-holder.

13. A shaping device comprising a cutter and a pattern head mounted so as to maintain a fixed relation between certain axes thereof, a work-holder and a pattern follower pivotally mounted about an axis perpendicular to the plane thereof so as to maintain a like fixed relation between corresponding axes, and means for mounting said pivotally mounted pattern and work-holder so as to be bodily and angularly movable so that the same relation of the axis of the follower to the pattern, which the pattern imposes upon the follower, is imposed upon the axis of the work-holder.

14. In a shaping device, the combination of a shaping means having a definite relation to a predetermined axis, means for mounting a head with the axis thereof parallel to the axis of said shaping means, a feeler and a work-carrier, means movable bodily in a vertical direction for mounting, for universal movement but in mutual control of each other, said feeler and said work-carrier, said feeler being adapted to enter and fit a bore in the head, above referred to, to insure the same angular relation of the axis of said holder to the shaping means as the bore of said head bears to the axis of said shaping means.

15. In a shaping device, the combination of a cutter having a definite relation to a predetermined axis, means comprising a chuck for readily mounting successive heads with the axis thereof parallel to the axis of said cutter, means for mounting, for universal movement but in mutual control of each other, of a feeler and a work-carrier, said feeler being adapted to be moved longitudinally to enter and fit a bore in the head above referred to, to insure the same angular relation of the axis of said holder to the cutter as the bore of said head bears to the axis of said cutter.

16. In a device of the class described, the combination of a shaping means having a definite relation to a predetermined axis, means for mounting a head with the axis thereof parallel to the axis of said shaping means, a feeler and a work-carrier, a shaft for pivotally mounting said feeler and said work-carrier, means pivotally mounting said shaft to afford universal movement of said feeler and said work-carrier, devices interconnecting said feeler and said work-carrier to maintain them in mutual control of each other, said feeler being adapted to enter and fit a bore in the head above referred to, to insure the same angular relation of the axis of said holder to the shaping means as the bore of said head bears to the axis of said shaping means.

17. In a device of the class described, the combination of pivoted means for holding a shaft to be shaped to fit the bore of a head, devices for holding the head in fixed position, a pivoted member for insertion into the bore of the head to position said shaft holding means, said member and said holding means being interconnected to transmit the movement of one to the other, and a common support, bodily movable in a vertical direction, for said pivoted means and said pivoted member.

18. In a device of the class described, the combination of pivoted means for holding a shaft to be shaped to fit the bore of a head, devices for holding the head in fixed position, a pivoted member for insertion into the bore of the head to position said shaft holding means, said member and said holding means being interconnected to transmit the movement of one to the other, a bearing, a common support pivotally mounted in said bearing, bodily movable in a vertical direction, for said pivoted means and said pivoted member, and means for counterbalancing the weight of said support, said pivoted means and said pivoted member.

HENRY K. B. DAVIS.